INVENTOR
ZDENEK J. LANSKY
BY
Oberlin, Maky & Donnelly
ATTORNEYS

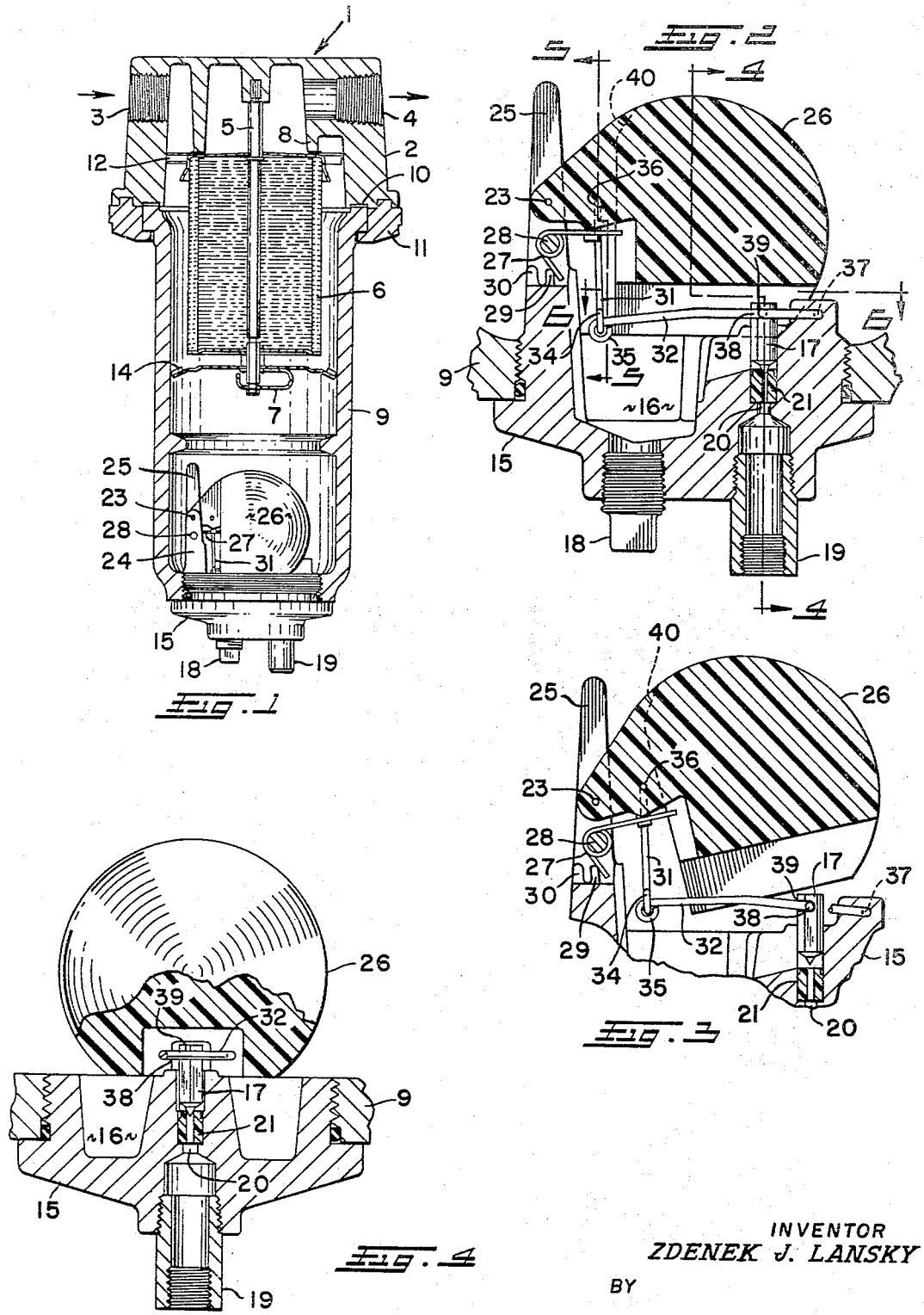
July 11, 1967　　　Z. J. LANSKY　　　3,330,292
AIR LINE FILTER AND DRAIN FLOAT ASSEMBLY THEREFOR
Filed Aug. 12, 1964　　　2 Sheets-Sheet 1
INVENTOR
ZDENEK J. LANSKY
BY
Oberlin, Maky & Donnelly
ATTORNEYS July 11, 1967  Z. J. LANSKY  3,330,292
AIR LINE FILTER AND DRAIN FLOAT ASSEMBLY THEREFOR
Filed Aug. 12, 1964  2 Sheets-Sheet 2

3,330,292
AIR LINE FILTER AND DRAIN FLOAT ASSEMBLY THEREFOR

Zdenek J. Lansky, Winnetka, Ill., assignor to Parker-Hannifin Corporation, Cleveland, Ohio, a corporation of Ohio
Filed Aug. 12, 1964, Ser. No. 389,076
7 Claims. (Cl. 137—192)

The present invention relates generally as indicated to an air line filter and drain float assembly therefor.

As well known, it is conventional practice to install filters in air operated systems which not only filter out solid particles of foreign matter from the air stream but which also separate water or other liquid particles therefrom and collect the liquid in a bowl. Periodically the accumulated liquid drained from the bowl by either a manually operated valve or by a float operated valve.

Heretofore, when float operated valves have been used for this purpose, the floats have been either of solid construction from lightweight materials such as cork or unicellular rubber or they have been of hollow construction from heavier materials such as metals. The lightweight materials heretofore used are either liquid absorbent so as to become water logged after extended use or are compressible when subject to fluid pressure so that the buoyant force varies with the pressures. Cork, which is about 50% air by volume, has both disadvantages. Unicellular rubber, although not water absorbent, contains air and is compressible under fluid pressure.

Floats of hollow construction may collapse under pressure or develop leaks and fill up with liquid so as to lose their buoyancy.

To overcome these objections, the present invention provides a float of solid construction and of a material that is homogeneous throughout so as to be devoid of air pockets or cells whereby the material will neither become water logged nor compress appreciably at the pressures employed. Since otherwise suitable materials having these characteristics have a specific gravity ranging from slightly less to substantially greater than that of water or other liquid in which the floats are to operate and thus do not of themselves have sufficient buoyancy to properly operate the associated valve mechanism, the present invention also provides a means for counterbalancing a portion of the weight of the float whereby the float will have the required buoyancy.

Accordingly, it is a principal object of this invention to provide a float operated filter drain valve of a type in which the float is solid and devoid of air spaces so as to be substantially incompressible and water resistant so that when said float is submerged the buoyant force of the water thereon is constant regardless of the ambient pressure to which the float may be subjected.

It is another object of this invention to provide a float operated valve in which the float is solid and incompressible and whose weight is partially counterbalanced by a spring to enable the float to have sufficient buoyancy and weight in the liquid in which it is submerged for opening and closing the valve.

It is another object of this invention to provide a novel pivotal mounting of a filter drain float and a novel linkage arrangement between the float and the drain valve.

Other objects and advantages of the present invention will become apparent as the following description proceeds.

To the accomplishment of the foregoing and related ends, the invention then comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGURE 1 is a central vertical cross-section view of an air line filter employing the present float controlled drain valve;

FIGURE 2 is an enlarged cross-section view of the float controlled drain valve assembly;

Figure 5:
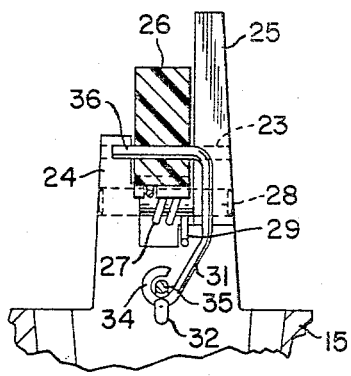
Figure 6:
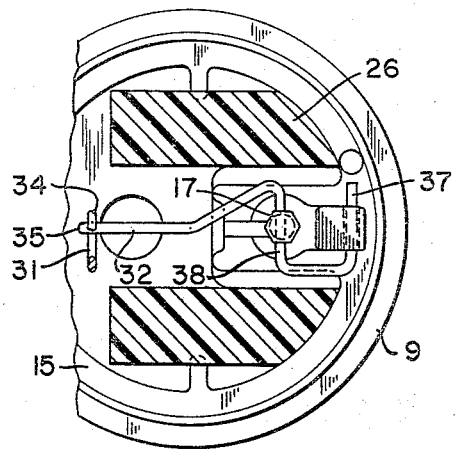

FIGURE 3 is a cross-section view similar to FIGURE 2 except showing the float in a position opening the drain valve; and FIGURES 4, 5 and 6 are cross-section views taken substantially along the lines 4—4, 5—5 and 6—6 of FIGURE 2.

Referring now more particularly to the drawings and first to FIGURE 1, the air line filter assembly 1 herein shown comprises a body 2 having an air inlet port 3, an air outlet port 4 and a center post 5 through which the filter element 6 is sealingly clamped by the spring retainer means 7 to the downwardly depending annular boss 8 in said body 2. The filter element 6 may be of conventional form such as a ribbon type filter which provides edge filtration to remove fine particles, or a porous sintered bronze filter.

The filter bowl 9 is clamped against a gasket 10 in said body as by means of the clamp collar 11 which is secured to the body 2 as by screws (not shown).

The air that enters the body 2 through the inlet 3 has imparted thereto a whirling motion by the deflector plate 12, whereby larger or heavier solid particles and water particles in the air are thrown out by centrifugal force so as to gravitate along the side wall of the bowl 9. The lower baffle plate 14 reverses the whirling motion of the air to thus provide a quiet zone below so that the solids and liquid remain trapped and quiescent in the lower portion of the filter bowl 9. The whirling air moves around the filter element 6 and finds its way to the outlet 4 through the myriad of openings in element 6.

Screwed into the bottom of the filter bowl 9 is the bowl plug 15 which has a sump 16 to collect solid material well below the drain valve 17. A removable drain plug 18 is provided at the bottom of said sump 16 for easy inspection and cleaning out of the solid materials therein.

The filter bowl plug 15 has a drain fitting 19 secured thereto, and in the drain opening 20 there is provided a plastic or like drain valve seat element 21 with which the drain valve 17 cooperates to close and open the drain opening 20 for liquid in the lower portion of the filter bowl 9.

Pivotally mounted on the pin 23 whose ends are anchored in the upstanding arms 24–25 is a substantially spherical float 26 which is of solid incompressible material such as polypropylene which will not absorb an appreciable amount of water and which contains substantially no air space or pockets. Because the polypropylene has a specific gravity of about 0.91, only 0.09 of its volume can provide buoyant force for actuating the valve when the float is completely submerged. The force provided by this percentage of volume is insufficient to properly operate the valve unless the float is made unreasonably large. It has been found that for good results with floats of reasonable size the specific gravity or apparent specific gravity of the float should be in the neighborhood of 0.4. In the present construction a torsion spring 27 mounted on the pin 28 and having its legs respectively engaged with one or the other of the formations 29 or 30 on the arm 25, is employed to counterbalance part of the weight of float 26, the force exerted by spring 27 being such that the apparent specific gravity of the float is about 0.4. With this arrangement when the level of liquid in bowl 9 rises to a predetermined level, the buoyant force of the liquid from the float plus the force exerted on the float by spring 27 swings the float 26 upwardly as shown in FIGURE 3. Such upward pivotal movement of the float 26 through the links 31 and 32 causes upward opening movement of the drain valve 17 (see FIGURE 3), whereby air under pressure in the filter bowl 9 expels the liquid through the seat member 21 and through the drain fitting 19 until the level of the liquid decreases to the point where the weigth of the float 26 minus the spring and buoyant forces thereon is sufficient to lower the float to the extent that drain valve 17 is seated against seat member 21.

As shown, links 31 and 32 are provided with interengaged eyes or loops 34 and 35 constituting a universal hinge joint and the link 31 has a lateral leg 36 which extends through an opening in the float 26. The other link 32 has a lateral leg 37 extending through an opening in the bowl plug 15 and has a lateral portion 38 which fits into a transverse slot 39 formed in the drain valve 17.

It is to be noted that the aforesaid linkage provides a substantial mechanical advantage for opening and closing the drain valve 17. Although the spring 27 exerts less force on the float 26 as the latter swings up, such force is exerted on an increasing moment arm while the buoyant force acting on the center of gravity of the float 26 acts through a decreasing moment arm.

Surface 40 of the float 26 constitutes a stop which engages arm 25 to limit upward swinging of said float 26. In the event a solid homogeneous material having a specific gravity greater than 1.0, such as Bakelite, is desired to be used for the float, a stronger spring 27 is selected for counterbalancing the weight of the float to the extent necessary for achieving the desired apparent specific gravity for the float.

Other modes of applying the principle of the invention may be employed, change being made as regards the details described, provided the features stated in any of the following claims, or the equivalent of such, be employed.

I therefore particularly point out and distinctly claim as my invention:

1. An automatic drain valve for draining water which accumulates in a pressure vessel having a drain passage in the bottom thereof, comprising a pressure-seated valve member movable in said vessel to open and close said drain passage and having a transverse slot in the upper end thereof, a float member pivotally mounted in said vessel, and a pair of links having one of their ends pivotally connected to each other and the other ends pivotally connected to said float member and pressure vessel, respectively, said link which is pivotally connected to said pressure vessel comprising a continuous member including between its ends a laterally extending portion received in said transverse slot in said valve member to effect raising and lowering of said valve member for opening and closing of said drain passage in response to swinging movement of said float member in opposite directions.

2. The drain valve of claim 1 in which said float member is solid and incompressible and has a specific gravity such that there is insufficient buoyant force applied to said float member by the water for raising said float member when the level of water in said pressure vessel reaches a predetermined level, and wherein spring means compressed between said pressure vessel and said float member augments the buoyant force of water acting on said float member whereby said float member is swung upwardly when the level of water in said pressure vessel reaches such predetermined level.

3. The drain valve of claim 2 in which said float member is of polypropylene having a specific gravity of approximately .91.

4. The drain valve of claim 2 in which said float member has a specific gravity greater than .4 and said spring means exerts a force upon said float member such that the apparent specific gravity of said float member is about .4.

5. The drain valve of claim 2 wherein said spring means is a torsion spring which is mounted on a pivot vertically spaced from said float member pivot, and said torsion spring contacts said float member at a point spaced from both of said pivots.

6. An automatic drain valve for an air line filter or the like comprising a filter bowl for accumulation of water in the bottom thereof and having a drain opening therein, a float actuated drain valve assembly disposed in said filter bowl arranged to open said drain opening upon accumulation of water therein to a predetermined level, said assembly comprising a float having on one side thereof a horizontal pivotal connection with said filter bowl, a first downwardly extending link having at its upper end a pivotal connection with said float about an axis parallel to the pivotal axis of the connection with said float to said filter bowl, a second generally horizontally extending link pivotally connected at one end to the lower end of said first link and pivotally connected at its other end to said filter bowl about an axis parallel to the pivotal axes of said first link and said float, a generally vertically movable drain valve member movable downwardly and upwardly, respectively, to close and open said drain opening, said drain valve member having a generally transverse slot therein, and said second link comprising a continuous member including a laterally bent portion between the ends thereof which is received in said transverse slot whereby upward swinging of said float moves said first link upwardly to thus swing said second link upwardly about its pivotal connection with said filter bowl thus to elevate said drain valve member to open said drain passage.

7. The automatic drain valve of claim 6 wherein said first and second links comprise wires having interengaged loops and laterally bent ends respectively fitting in holes in said float and filter bowl, respectively, to constitute the aforesaid pivotal connections.

References Cited

UNITED STATES PATENTS

| | | | |
|---|---|---|---|
| 248,877 | 11/1881 | Osborne | 137—192 |
| 1,032,787 | 7/1912 | Singer | 137—192 |
| 1,409,550 | 3/1922 | Jennings | 137—192 |
| 2,064,156 | 12/1936 | Firth | 137—435 |
| 2,724,403 | 11/1955 | De Salardi | 137—445 X |
| 2,760,596 | 8/1956 | Kellie | 137—192 X |
| 3,139,897 | 7/1964 | Morgan | 73—322.5 X |
| 3,199,526 | 8/1965 | Pall | 137—192 |
| 3,234,792 | 2/1966 | Ririe | 73—309 X |

ALAN COHAN, *Primary Examiner.*